July 23, 1935.  W. W. PATNOE  2,009,055
CLASSIFIER
Filed July 30, 1932    2 Sheets-Sheet 2
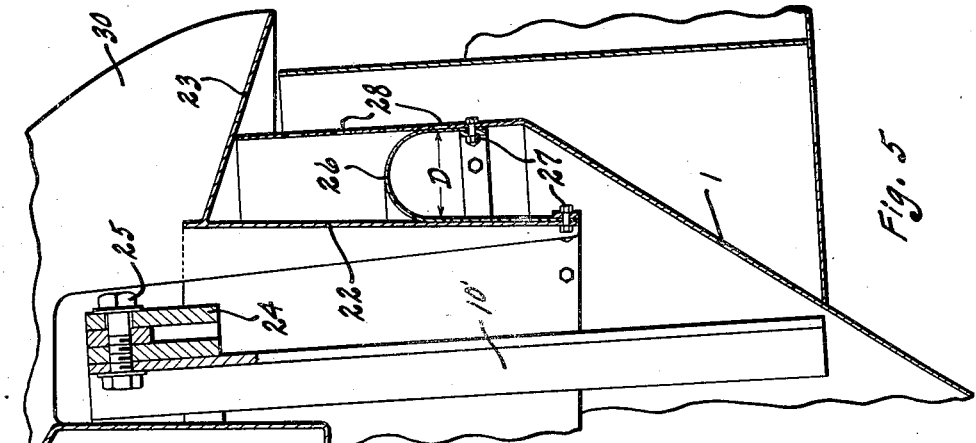
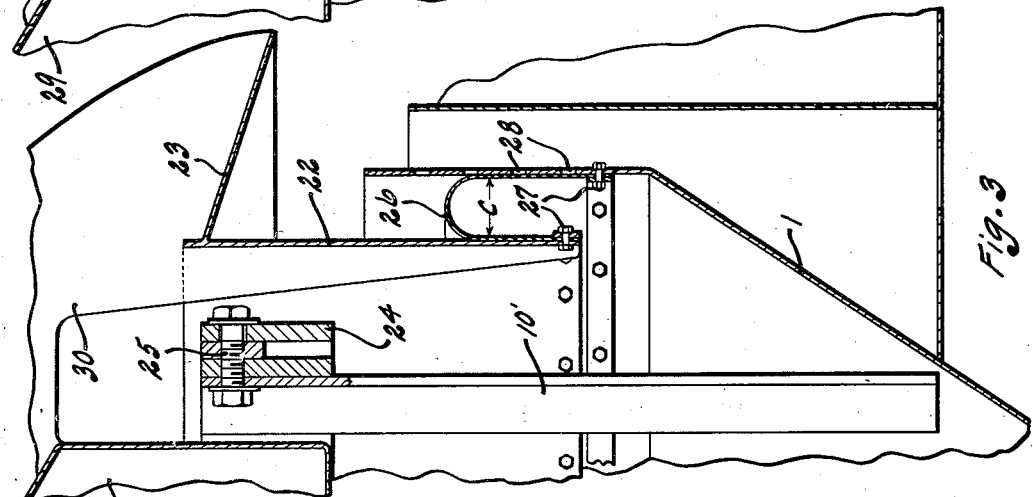
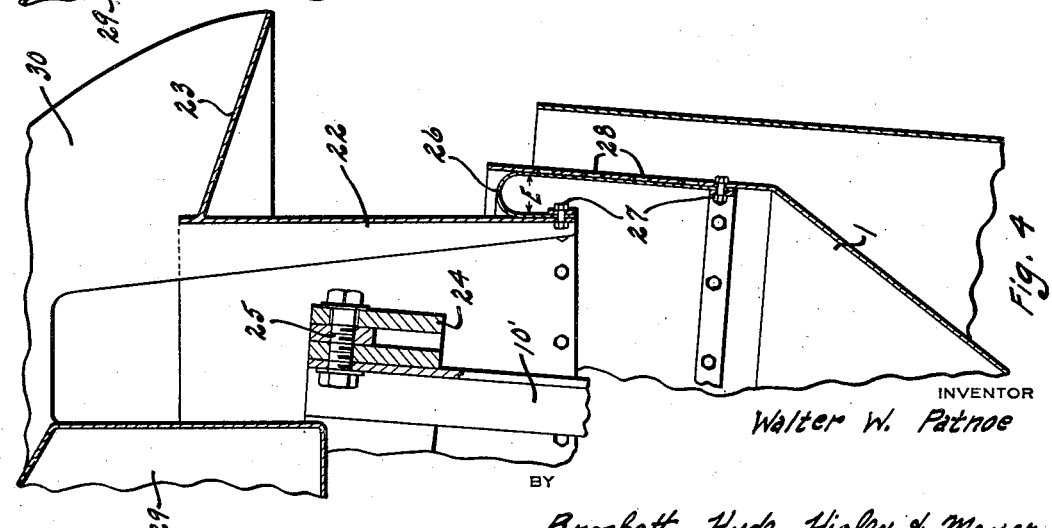
INVENTOR
Walter W. Patnoe
BY
Brockett, Hyde, Higley & Meyer
ATTORNEYS Patented July 23, 1935

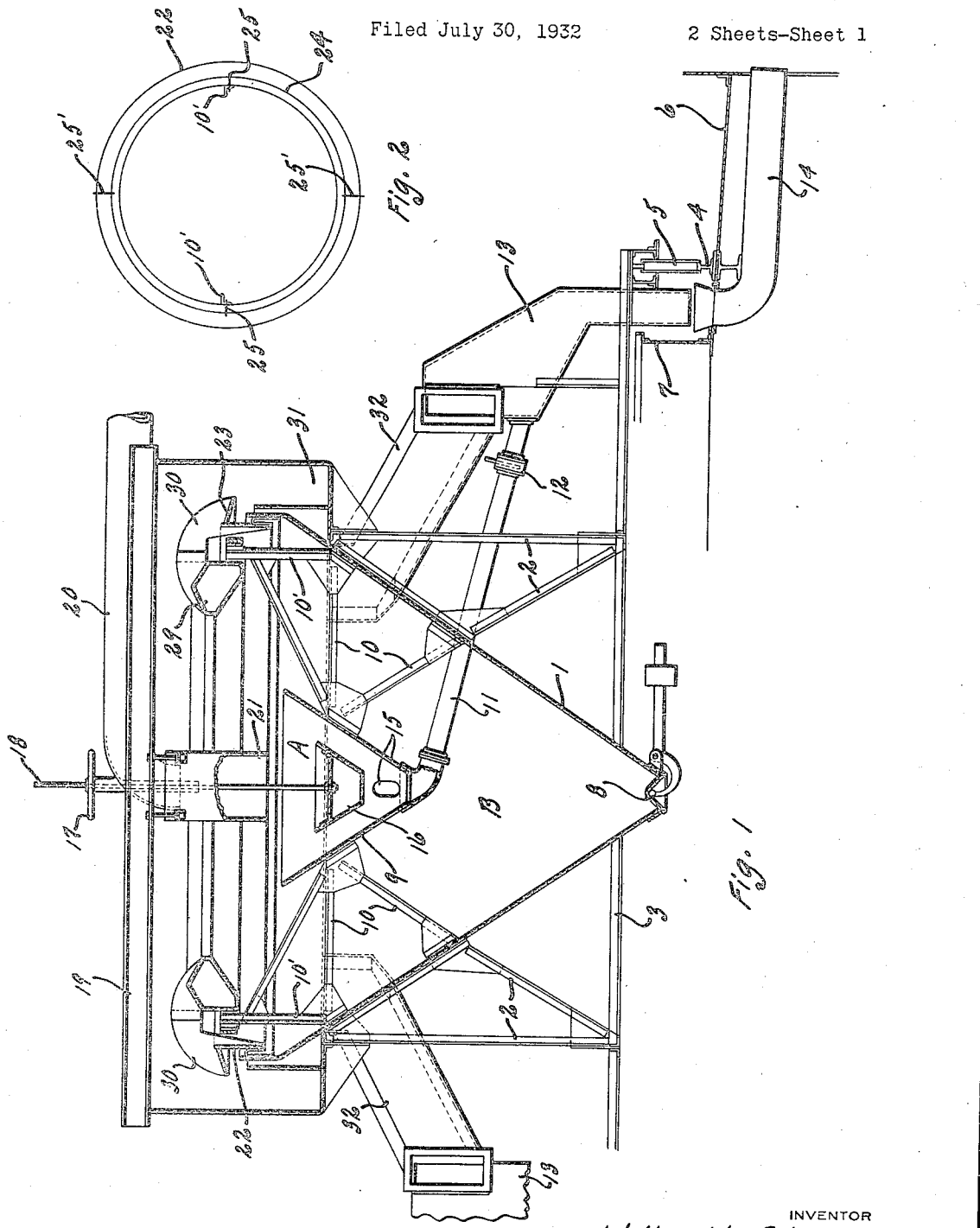

2,009,055

UNITED STATES PATENT OFFICE 2,009,055

CLASSIFIER

Walter W. Patnoe, Shaker Heights, Ohio, assignor to Non-Metallic Minerals, Incorporated, Cleveland, Ohio, a corporation of Ohio Application July 30, 1932, Serial No. 626,404

15 Claims. (Cl. 209—208)

This invention relates to apparatus for commercially improving rock materials such as sand, gravel and the like. The general type of treatment in such apparatus is hydraulic separation or what is known as classification, wherein solid particles submerged in a stream of water are separated according to their size, specific gravity or other properties. The general principles upon which the operation is based are well understood in the art, and it will suffice to state here that an essential part of the apparatus is an open tank relative to which inflow and overflow is had, and within which particles of certain characteristics are collected by settling from the water in which they were entrained.

Where a single such tank is employed it will be apparent that but one classifying differentiation is possible: the separation of particles which will be collected in the tank, from those which will be carried beyond the tank. Commercial demands, however, are usually so exacting that a plurality of tanks are arranged to function as in series, to accomplish as many grades in the classified product. There is no objection to this where ample space is available, as in open spaces upon land.

An object of this invention is to provide an arrangement wherein the effect of such plurality of tanks is had, in a minimum space, as in portable arrangements.

One of the applications where space must be conserved is upon shipboard, as in sand suckers. But since the proper functioning of the apparatus concerned depends upon gravity, and is in fact very sensitive to exact maintenance of levels, additional problems are presented when its use on shipboard is attempted under the rolling conditions often there met.

A further object of my invention is to provide means whereby level of the critical parts of the structure is maintained automatically and independent of that of the substructure upon which the apparatus is mounted.

The exact nature of this invention together with further objects and advantages thereof will be apparent from the following description taken in connection with the accompanying drawings, in which Fig. 1 is a view generally in sectional elevation illustrating an installation embodying the invention; Fig. 2 is a diagrammatic showing, in plan, of the arrangement by which motion of the lip means is confined, as will appear; Fig. 3 is an enlarged detail of parts appearing in Fig. 1; and Figs. 4 and 5 are views similar to Fig. 3, illustrative of the functioning of the parts with relative motion in opposite directions.

With reference now to Fig. 1, I is the body part of an open tank. It is conical and supported with its open mouth uppermost, by means of structural members 2, upon a substructure 3. This substructure may in turn be mounted upon a runway indicated at 4 by means of wheels 5. The runway is indicated as extending along the deck 6 of a vessel, that the tank I may be positioned over the various hatches thereof. The tank body I is provided with a valve 8 at its lower extremity, to deliver by gravity through the hatchway 7.

Within the tank body I is a second, smaller tank 9, of similar conical form and supported by structural members 10 in concentric spaced relation with the tank I to provide a central chamber A and therabout a chamber B.

Leading from the bottom of the tank 9 is a delivery pipe 11, valved as at 12, and here shown as directed into an overflow 13. The vessel may be provided with scupper means indicated at 14 to receive and direct overboard overflowing matter. The tank 9 adjacent its lower end is provided with openings 15 adapted to be closed when desired by lowering of the open-ended valve 16. This valve is adjustable by a hand wheel 17 threaded upon its stem 18, the whole being carried by a superstructure 19.

A feed pipe 20 is supported on the superstructure 19 and has a mouth 21 located centrally of the tanks, below the liquid level, and directed toward the inner tank 9 as indicated. It will be appreciated that the pipe 20 leads from a pump and other suitable means by which water containing solids such as sand, is supplied to the apparatus.

It will be seen that what has thus far been described is so related to the vessel supporting the apparatus, as to be thrown out of plumb by any list of the vessel. Thus overflow directly from the body part I of the larger tank would be uniform about the mouth of the tank only were the supporting vessel perfectly level and stationary, conditions not usually prevailing.

According to this invention, therefore, I provide at the mouth of the body part I, movable lip means 22 extending downwardly below the upper edge of the body part and therewithin. The lip means here shown is endless, circular, and includes an outwardly extending spillway 23.

The lip means is to remain level independent of the list of the other parts, and is to remain substantially concentric with its tank body. To this end its motion is confined to that about a central point substantially in its plane. For the purpose the ring 24 is supported by a pair of diametrically opposed bolts 25 upon a pair of structural parts 10' within the outer tank. Disposed at 90° from the bolts 25 are another pair of bolts 25' outwardly extending from the ring 24 and connected with the lip means 22. It will be apparent that the arrangement is one whereby the lip means is free to tilt about a central point, the member 24 being a gimbal ring and the bolts 25 comprising its associated pivotal connections.

That there may be no overflow from the tank body 1 except by way of the lip means, the annular space therebetween is made water-tight by a flexible sealing member 26, as of sheet rubber, leather or the like. This member is annular and has its edges downwardly turned and secured to the adjacent parts as at 27, Fig. 3, with an upward bight therebetween forming an annular upwardly extending pocket. It will be noted that the bight of the sealing member is disposed substantially below the plane of the gimbal. The upper extremity of the tank body 1 extends beyond the sealing member 26 to serve as a backing therefor, and is perforated as at 28 to provide drainage from the space thereabove.

That the lip member may be responsive to level of the tank liquid and the gimbal joint relieved of the weight of the lip member, an annular float 29 of large diameter is provided and associated in supporting relation with the lip member as by a plurality of peripherally spaced brackets 30 arched as indicated to clear the gimbal ring 24 and its associated parts. The capacity of the float is preferably approximately sufficient to support the lip means and its associated parts.

An annular trough 31 is arranged to receive overflow from the spillway 23 of the lip means, and drains 32 therefrom are provided as leading to the overflow 13.

Operation will be as follows, assuming feed being had through the pipe 20, the valve 16 raised as indicated, and the valve 12 closed. Chambers A and B of the tanks will be filled with liquid bearing solid particles. Overflow will be had by way of the lip means and particularly the spillway 23 thereof; into the trough 31 thence overboard by way of the drains 32, overflows 13 and scuppers 14.

Solid particles above a certain size and/or specific gravity will settle to the bottom of the chamber B, either directly or by way of the smaller tank 9, and smaller and/or lighter particles will be carried upwardly and away with the overflowing water, all according to principles well known in the art. Upon sufficient accumulation in the bottom of the chamber B the weight of the solids collected will open the valve 8 and delivery will be had into the hatch of the vessel, the valve being balanced to closed position as is usual in the art.

Suppose now the valve 16 be lowered and the valve 12 opened, flow from the feed mouth 21 will be first downwardly into the chamber A thence up over the lip of the tank 9, and downwardly into the chamber B before overflow. Some of the solid particles fed to the apparatus will be so large and/or heavy that they will pass downwardly into the delivery pipe 11 and never attain the chamber B. As shown these products will be discarded but obviously the pipe 11 might be directed to a suitable container for them. At any rate the tank 1 will deliver only those solids which are neither retained by the tank 9 or overflowed from the tank 1 past the lip means.

Similarly a greater plurality of tanks could be arranged in spaced nested relation, and a corresponding increase in classification had.

Thus far it has been assumed that the apparatus has been maintained plumb. Suppose, however, the vessel has a list, as to starboard or port as indicated Figs. 4 and 5 respectively. Obviously the float 29 will tend to maintain the lip means level, by an automatic adjustment at the gimbal joint, the sealing connection 26 flexing with this adjustment.

Since the lip means past which overflow is had, is above the elevation of the sealing member, there will be a hydrostatic pressure exerted upwardly in the annular pocket thereof, the member acting as a piston. When the parts are exactly concentric the horizontal clearance indicated at C, Fig. 3, between the lip means and its surrounding tank edge, which is closed by the sealing member, will be perfectly annular so that this pressure will be exerted equally entirely about the periphery of the lip means.

Since, however, the center of motion provided by the gimbal joint is above the sealing member, the relative motion of the parts about this center will increase this clearance at that part of the lip means where the tank edge rises relative thereto as at D, Fig. 5; and such relative motion will decrease this clearance at that part of the lip means where the tank edge lowers thereto as at E in Fig. 4. But as this horizontal clearance becomes greater the unit hydrostatic pressure will become less, and vice versa, since the clearance can only increase as the bight of the sealing connection 26 at that point approaches the liquid level just above the lip means. It will be noted that the elevation of the bight is a function of the difference in elevations of the corresponding lip and tank parts, the bight moving up or down only one half as far as the tank edge moves up or down relative to the lip means.

The parts are so proportioned and arranged that these two functions of area and head offset each other as they vary, so that in the last analysis the lip means is responsive to the float, as to level, and to the gimbal joint as to position. In any event it will be observed that the lip means is maintained level independent of tilt of the other tank parts of the apparatus, and overflow will be maintained uniform entirely about the periphery of the tank.

What I claim is:

1. In apparatus of the class described, an open tank having a body and tiltably supported lip means at its mouth, said lip means extending within the corresponding part of said body, and flexible sealing means there arranged between the parts, said lip means having a spillway part overhanging said body to carry overflow from said tank beyond said sealing means, and means for maintaining the level of said lip means independent of that of said body.

2. In apparatus of the class described, an open tank having a body and tiltably supported lip means at its mouth, said lip means extending within the corresponding part of said body, sealing means there arranged between the parts and comprising a flexible member having a bight providing an upwardly extending pocket.

3. In apparatus of the class described, an open tank having a conical body, lip means at its mouth and extending therewithin, annular sealing means there arranged between the parts, said sealing means comprising a flexible member having an upwardly extending bight, and means for automatically maintaining the level of said lip means independent of that of said body.

4. In apparatus of the class described, an open tank having side walls, lip means at its mouth and extending within the side walls, sealing means arranged between the lip means and side walls, said sealing means comprising a flexible member having an upwardly extending bight, and means providing buoyancy for said lip means.

5. In apparatus of the class described, a tank open at the top to provide a mouth, lip means extending within the mouth and tiltably supported relative thereto, said lip means having a spillway portion extending outwardly over the mouth of said tank to discharge overflow therefrom, and means for automatically maintaining said lip means level independent of tilting of the tank.

6. In apparatus of the class described, a tank open at the top to provide a mouth, lip means extending within the mouth and tiltably supported relative thereto, said lip means having a spillway portion extending outwardly over the mouth of said tank to discharge overflow therefrom, and float means associated with said lip means to maintain the lip means level independent of tilting of the tank.

7. In apparatus of the class described, a tank open at the top to provide a mouth, lip means extending within the mouth and tiltably supported relative thereto, said lip means having a spillway portion extending outwardly over the mouth of said tank to discharge overflow therefrom, flexible sealing means between said lip means and said tank, and float means associated with said lip means and arranged to be responsive to the tank liquid level.

8. In apparatus of the class described, a tank open at the top to provide a mouth, lip means extending within the mouth and tiltably supported relative thereto, said lip means having a spillway portion extending outwardly over the mouth of said tank to discharge overflow therefrom, flexible sealing means between said lip means and said tank, means for automatically maintaining said lip means level independent of tank tilting, and means for confining said lip means to clear said body.

9. In apparatus of the class described, a tank open at the top to provide a mouth, lip means extending within the mouth and tiltably supported relative thereto, said lip means having a spillway portion extending outwardly over the mouth of said tank to discharge overflow therefrom, means for automatically maintaining said lip means level independent of tank tilting, and said tiltable support being arranged to confine said lip means to move about a point.

10. In apparatus of the class described, an open tank having lip means at its mouth mounted for tilting about a central point, said lip means extending within the tank and having a spillway portion extending over the mouth of the tank, flexible sealing means arranged between said lip means and tank below said point, and float means associated with said lip means to maintain the level thereof responsive to the tank liquid level.

11. In apparatus of the class described, an open tank having tiltably supported endless lip means at its mouth, said lip means extending within the corresponding part of said tank and having a spillway portion extending outwardly over the mouth of the tank, flexible sealing means arranged between the lip means and tank, and said sealing means and tiltable support being adapted to automatically maintain said lip means level independent of tilting of said tank.

12. In apparatus of the class described, an open tank having a conical body and endless lip means at its mouth mounted for tilting about a central point generally in the plane of said lip means, said lip means extending within the body and having a spillway portion extending outwardly over the mouth of the tank, annular flexible sealing means arranged between said lip means and body below said point, and float means associated with said lip means to maintain the level thereof responsive to the tank liquid level.

13. In apparatus of the class described, a tank having side walls and open at the top to provide a mouth, lip means extending within the mouth of the tank and spaced therefrom by a gimbal joint connection; sealing means between the lip means and tank walls comprising a flexible member secured to the lip means and tank walls to form an upwardly extending bight therebetween, and the bight of said sealing means being disposed below the plane of the gimbal connection.

14. In apparatus of the class described, an open tank having side walls, a lip adjacent the tank mouth and extending within the side walls and spaced therefrom, means supporting said lip for tilting about a central point, fluid pressure responsive diaphragm means between the lip and tank walls at points about the tank, said diaphragm means being below the support means, whereby the fluid pressure responsive area of said diaphragm means at any point decreases as the tilting of the lip raises the lip relative to said diaphragm means at that point.

15. In apparatus of the class described, a tank having side walls and an open circular mouth, a cylindrical lip supported adjacent the tank mouth for universal tilting movement relative thereto, said lip extending within the tank and spaced from the side walls, fluid pressure responsive continuous diaphragm means arranged to be effective between the periphery of the inner portion of the lip and the tank walls, said diaphragm means being positioned below the lip support, whereby the fluid pressure responsive area of said diaphragm means at any point about said tank varies substantially in inverse ratio to the difference in elevation between said diaphragm means and the upper edge of the lip at the same point.

WALTER W. PATNOE.